US009449472B2

(12) United States Patent
Mastropietro

(10) Patent No.: US 9,449,472 B2
(45) Date of Patent: *Sep. 20, 2016

(54) GAMING SYSTEM AND METHOD EMPLOYING EVENT ELIGIBILITY-BASED EQUITY FOR A WAGERING GAME

(71) Applicant: WMS Gaming Inc., Waukegan, IL (US)

(72) Inventor: Michael W. Mastropietro, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,679

(22) Filed: Feb. 11, 2015

(65) Prior Publication Data

US 2015/0154835 A1 Jun. 4, 2015

Related U.S. Application Data

(63) Continuation of application No. 12/918,047, filed as application No. PCT/US2008/012426 on Nov. 3, 2008, now Pat. No. 8,979,637.

(60) Provisional application No. 61/108,970, filed on Oct. 28, 2008, provisional application No. 61/188,126, filed on Aug. 6, 2008, provisional application No. 61/124,693, filed on Apr. 18, 2008, provisional application No. 61/002,350, filed on Nov. 8, 2007.

(51) Int. Cl.

| | |
|---|---|
| *G06F 17/00* | (2006.01) |
| *G07F 17/34* | (2006.01) |
| *G07F 17/32* | (2006.01) |

(52) U.S. Cl.

CPC ............... *G07F 17/34* (2013.01); *G07F 17/32* (2013.01); *G07F 17/3213* (2013.01); *G07F 17/3223* (2013.01); *G07F 17/3244* (2013.01); *G07F 17/3258* (2013.01)

(58) Field of Classification Search

None

See application file for complete search history.

(56) References Cited

U.S. PATENT DOCUMENTS 4,652,998 A 3/1987 Koza
4,752,068 A 6/1988 Endo
5,609,525 A 3/1997 Ohno
6,165,071 A 12/2000 Weiss
(Continued)

FOREIGN PATENT DOCUMENTS

WO WO 2005/082480 A1 9/2005
WO WO 2006/002241 A2 1/2006
(Continued)

OTHER PUBLICATIONS

International Search Report, PCT/US2008/012426, dated Jan. 9, 2009, 6 pages.
(Continued)

*Primary Examiner* — Paul A D'Agostino

(74) *Attorney, Agent, or Firm* — Nixon Peabody LLP

(57) ABSTRACT

A gaming system and method for conducting a wagering game includes providing a first event eligibility-based equity relative to a first wagering game and converting the first event eligibility-based equity to an exchange medium. The exchange medium may be cash or a second event eligibility-based equity relative to a second wagering game. The first event eligibility-equity may be stored for later use on the first wagering game.

17 Claims, 8 Drawing Sheets

(56) References Cited

U.S. PATENT DOCUMENTS

| | | | | |
|---|---|---|---|---|
| 6,244,958 | B1 | 6/2001 | Acres | |
| 6,311,976 | B1 * | 11/2001 | Yoseloff | G07F 17/34 273/138.2 |
| 6,364,765 | B1 | 4/2002 | Walker | |
| 6,371,852 | B1 | 4/2002 | Acres | |
| 6,443,452 | B1 | 9/2002 | Brune | |
| 6,577,733 | B1 | 6/2003 | Charrin | |
| 6,582,310 | B1 | 6/2003 | Walker | |
| 6,702,672 | B1 | 3/2004 | Angell | |
| 6,758,757 | B2 | 7/2004 | Luciano, Jr. | |
| 6,780,111 | B2 | 8/2004 | Cannon | |
| 6,800,027 | B2 | 10/2004 | Giobbi | |
| 6,811,486 | B1 | 11/2004 | Luciano, Jr. | |
| 6,923,721 | B2 | 8/2005 | Luciano | |
| 6,966,836 | B1 | 11/2005 | Rush | |
| 7,063,617 | B2 | 6/2006 | Brosnan | |
| 7,291,068 | B2 | 11/2007 | Bryant | |
| 7,351,145 | B1 | 4/2008 | Ornstein | |
| 7,909,694 | B2 * | 3/2011 | Schugar | G07F 17/32 463/25 |
| 2001/0053712 | A1 | 12/2001 | Yoseloff | |
| 2002/0077169 | A1 | 6/2002 | Kelly | |
| 2002/0077174 | A1 | 6/2002 | Luciano | |
| 2003/0032474 | A1 | 2/2003 | Kaminkow | |
| 2003/0199312 | A1 | 10/2003 | Walker | |
| 2004/0082384 | A1 | 4/2004 | Walker | |
| 2004/0142742 | A1 | 7/2004 | Schneider | |
| 2004/0204228 | A1 | 10/2004 | Walker | |
| 2004/0242297 | A1 | 12/2004 | Walker et al. | |
| 2004/0254005 | A1 * | 12/2004 | Shackleford | G07F 17/32 463/13 |
| 2004/0259632 | A1 | 12/2004 | Crittenden | |
| 2005/0009601 | A1 | 1/2005 | Manfredi | |
| 2005/0020354 | A1 * | 1/2005 | Nguyen | G06Q 40/00 463/25 |
| 2005/0159207 | A1 | 7/2005 | Thomas | |
| 2005/0181856 | A1 | 8/2005 | Cannon | |
| 2005/0266919 | A1 | 12/2005 | Rowe | |
| 2006/0035696 | A1 | 2/2006 | Walker | |
| 2006/0035704 | A1 | 2/2006 | Rush | |
| 2006/0052161 | A1 | 3/2006 | Soukup | |
| 2006/0063581 | A1 | 3/2006 | Harris | |
| 2006/0068893 | A1 | 3/2006 | Jaffe | |
| 2006/0079316 | A1 | 4/2006 | Flemming | |
| 2006/0079317 | A1 | 4/2006 | Flemming | |
| 2006/0084495 | A1 | 4/2006 | Jaffe | |
| 2006/0089194 | A1 | 4/2006 | Joshi | |
| 2006/0148559 | A1 | 7/2006 | Jordan | |
| 2006/0287046 | A1 | 12/2006 | Walker | |
| 2007/0275777 | A1 * | 11/2007 | Walker | G07F 17/3227 463/16 |
| 2008/0004116 | A1 * | 1/2008 | Van Luchene | G07F 17/32 463/42 |
| 2008/0051176 | A1 | 2/2008 | Okada | |

FOREIGN PATENT DOCUMENTS

| | | | |
|---|---|---|---|
| WO | WO 2006/004831 | A2 | 1/2006 |
| WO | WO 2006/004832 | A2 | 1/2006 |
| WO | WO 2006/005073 | A2 | 1/2006 |
| WO | WO 2006/017036 | A1 | 2/2006 |
| WO | WO 2006/017067 | A1 | 2/2006 |
| WO | WO 2006/017068 | A1 | 2/2006 |
| WO | WO 2006/020811 | A2 | 2/2006 |
| WO | WO 2006/026250 | A2 | 3/2006 |
| WO | WO 2006/044252 | A2 | 4/2006 |

OTHER PUBLICATIONS

International Written Opinion, PCT/US2008/012426, dated Jan. 9, 2009, 5 pages.

* cited by examiner

GAMING SYSTEM AND METHOD EMPLOYING EVENT ELIGIBILITY-BASED EQUITY FOR A WAGERING GAME

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus, and methods for playing wagering games, and more particularly, to a gaming system and method which employs event eligibility-based equity.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Gaming terminals employ various types of event eligibility-based equity or credits. Some wagering games, for example, grant blocks of time during which the player is eligible for a bonus game. The player is granted these blocks of time based on various play characteristics, such as amount of wager, the amount of wager in a predetermined time period, and the like. One such wagering game is disclosed in PCT Published Application WO/2006/121663 to Anderson et al, entitled “Wagering Game with Time-Based Bonus” and assigned to WMS Gaming Inc., which is hereby incorporated in its entirety as if fully set forth herein.

Another type of event eligibility-based equity employed in gaming terminals are granting of entries or tickets in a lottery type game. In a general, a player is provided a number of entries in a lottery type game based on various play characteristics, such as maintaining a certain amount of time of play, wagering a certain amount and the like.

Figure 1A:
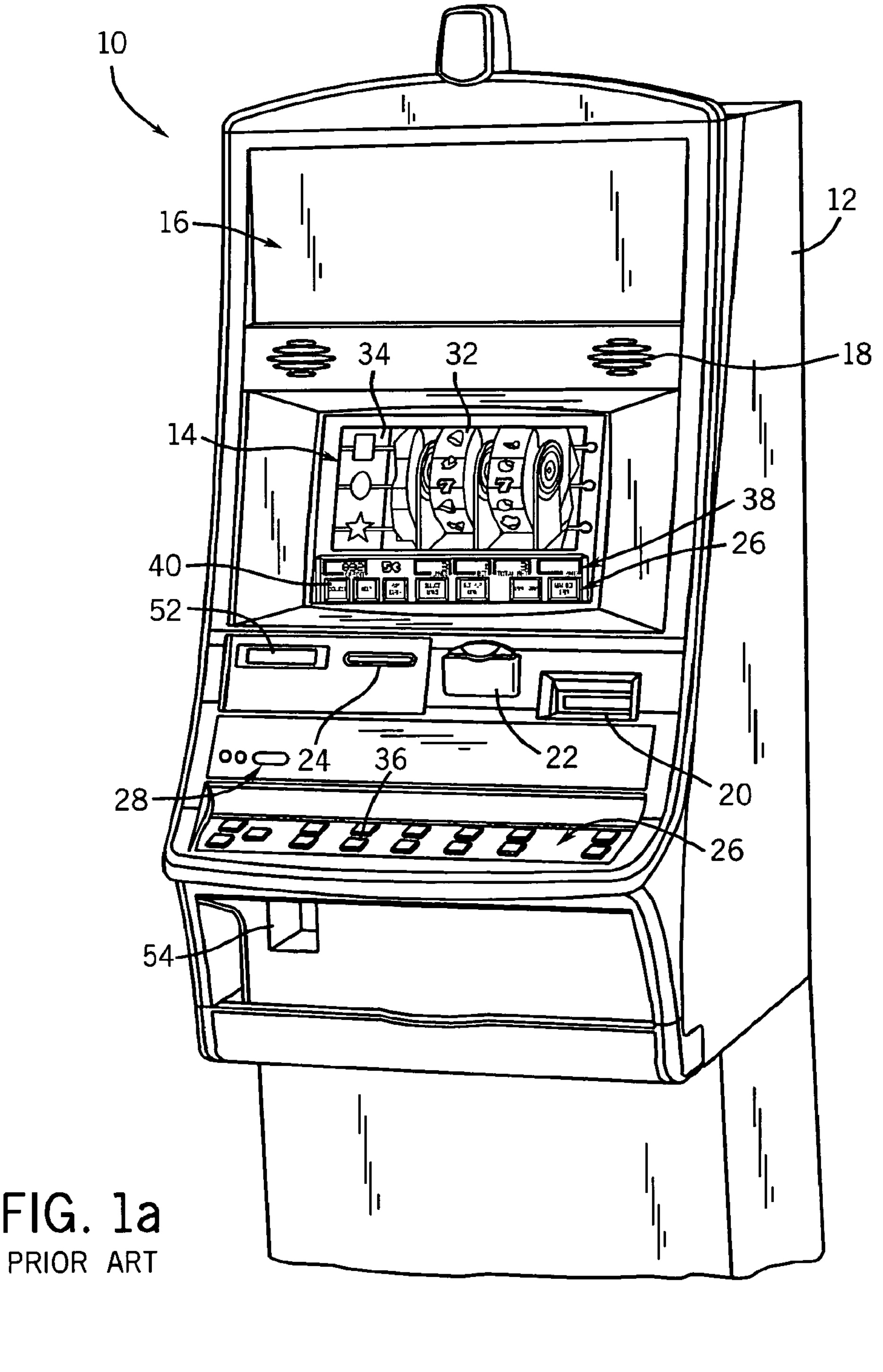
FIG. 1a PRIOR ART
FIG. 1*a* is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
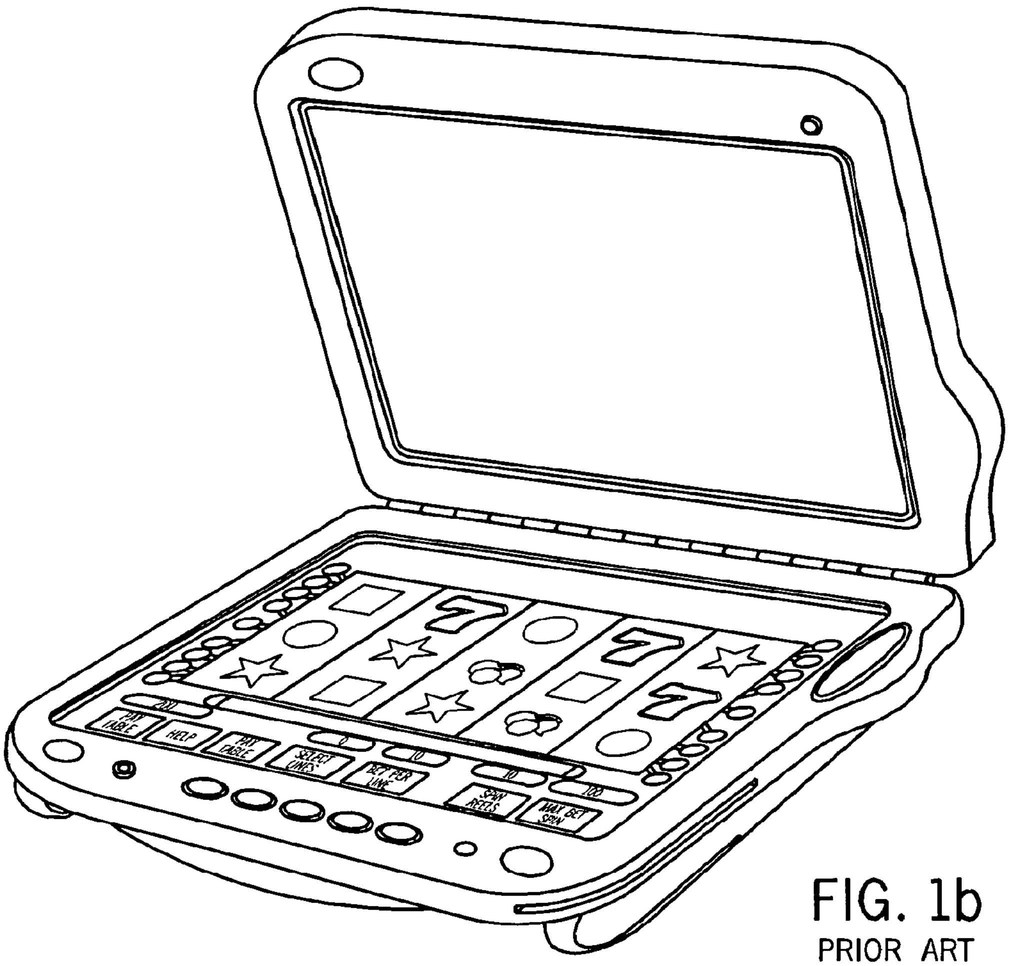
FIG. 1b PRIOR ART
FIG. 1*b* is a perspective view of a handheld gaming terminal according to an embodiment of the present invention.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled “Reel Spinning Slot Machine With Superimposed Video Image,” which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled “Portable Data Unit for Communicating With Gaming Machine Over Wireless Link,” which is incorporated herein by reference in its entirety. The account may be stored at an external system 46 (see FIG. 2) as more fully disclosed in U.S. Pat. No. 6,280,328 to Holch et al. entitled “Cashless Computerized Video Game System and Method,” which is incorporated herein by referenced in its entirety, or directly on the portable medium. To enhance security, the individual carrying the portable medium may be required to enter a secondary independent authenticator (e.g., password, PIN number, biometric, etc.) to access their account. Any of the above described methods may be employed, either singly or in combination, to store and transfer event eligibility-based equity.

FIG. 1*b* illustrates a portable or handheld device primarily used to display and/or conduct wagering games. The handheld device may incorporate the same features as the gaming terminal 10 or variations thereof. A more detailed description of a handheld device that may be utilized with the present invention can be found in PCT Patent Application No. PCT/US2007/000792 filed Jan. 26, 2007, entitled “Handheld Device for Wagering Games,” which is incorporated herein by reference in its entirety.

Figure 2:
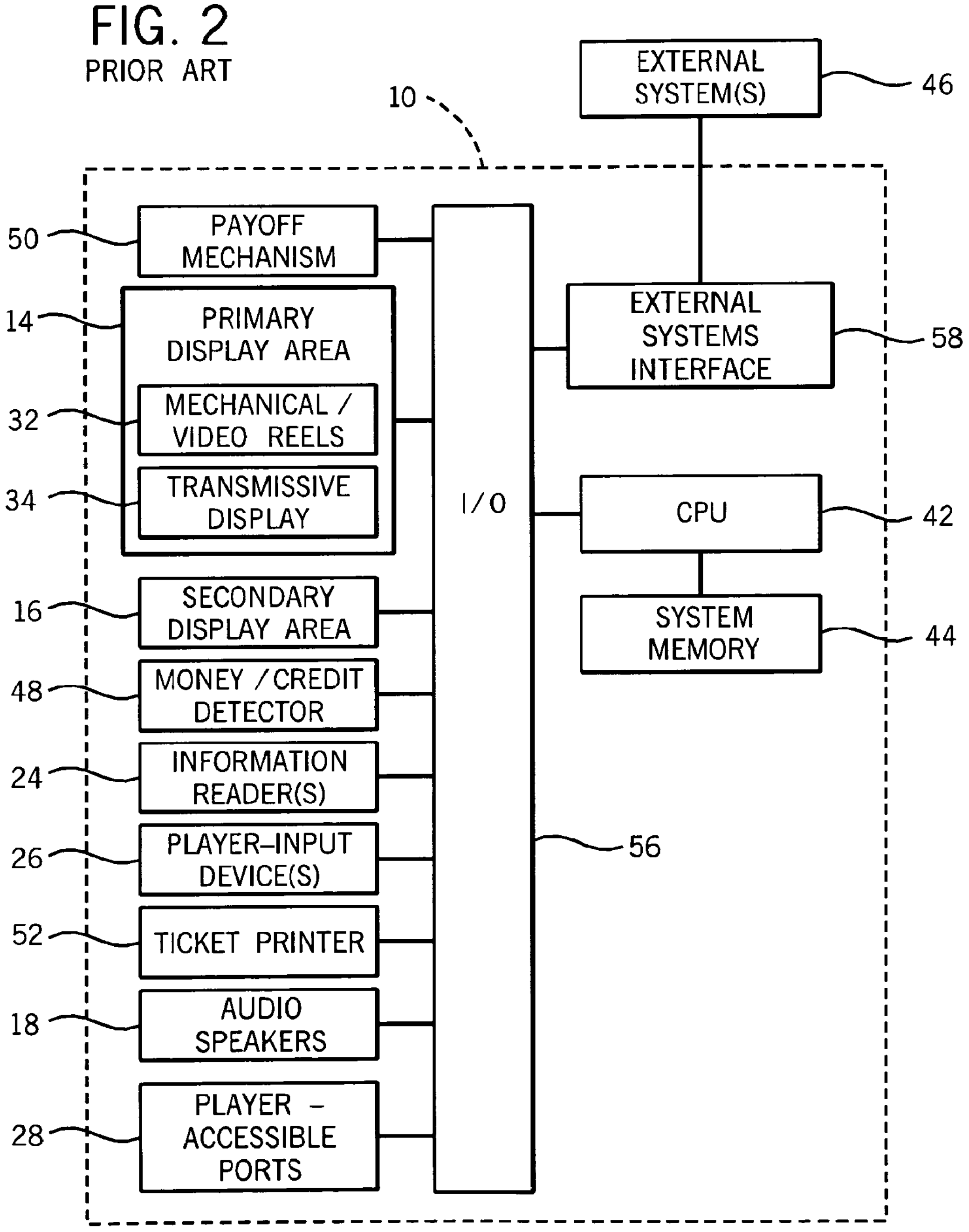
FIG. 2 PRIOR ART
FIG. 2 is a schematic view of a gaming system according to an embodiment of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
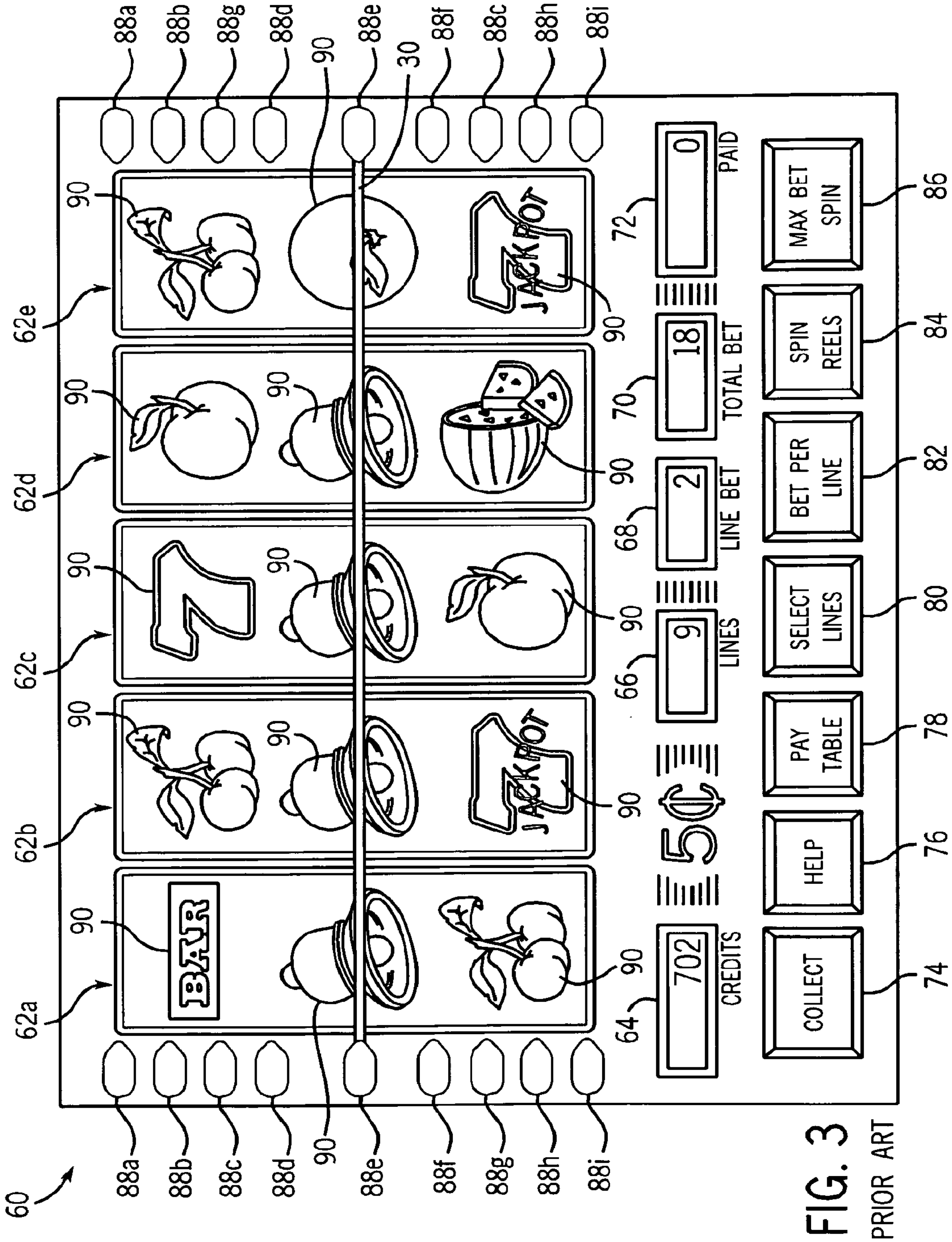
FIG. 3 PRIOR ART
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

A player may earn event eligibility-based equity while playing the wagering game. For example, the player may accrue time eligibility based equity, or time slices, for a bonus wagering game when triggered. The event eligibility of the player may be determined using a number of criteria. In one embodiment, eligibility for participation in the bonus wagering game comprises the player having a positive time balance in an eligibility and trigger meter at such time that the bonus wagering game is triggered. One such mechanism which may be used to both trigger the bonus wagering game and determine eligibility therefore is a time-based triggering mechanism which is described in above incorporated PCT Published Application WO/2006/121663 to Anderson et al, entitled "Wagering Game with Time-Based Bonus".

Many other triggering mechanisms and eligibility criteria may be used. For example, event eligibility-based equity may be awarded dependent upon the player wagering a certain minimum amount, maintaining a certain amount of time of play, maintaining at least a predetermined average wager, having a certain number of player points, reaching a certain level of a game, etc. A player may also purchase event eligibility-based equity which may be used in multiple wagering games. Event eligibility-based equity may also comprise entries in a standard lottery in which a player is assigned one or more numbers or entries, and then at a later time one or more numbers are picked and compared for matches, with some matching criteria being used to determine a win. Event eligibility-based equity may comprise any non-cash based equity which provides a player with eligibility for gaming options in a wagering game.

With respect to event eligibility-based equity, the controller 42, the system memory 44, the money/credit detector 48 and the external system 46, either singly or in combination, may comprise an award system, or means, for awarding or providing a first event eligibility-based equity relative to a first wagering game and a converter system, or means, for transforming the first event eligibility-based equity to an exchange medium. The exchange medium may be cash, first event eligibility-based equity or second event eligibility-based equity. Although only first and second event eligibility-based equity will be discussed herein, those skilled in the art will readily appreciate that the first event eligibility-based equity may be transformed or converted into any number of other event eligibility-based equity for play on any other number of wagering games.

The exchange medium may be stored on a player information device which communicates with the information reader 24. The player information device may comprise a ticket, voucher, coupon, casino card, smart card, debit card, credit card and the like. The exchange medium may be stored in the controller 42, the external system 46 or any external server in communication with first and second wagering games. The exchange medium may contain credits relating to first or second event eligibility-based equity such that the player may use on respective first and second wagering games. Further, one or more computer readable storage media may be encoded with instructions for directing the gaming system to perform a method of storing the first event eligibility-based event equity relative to a first wagering game and converting the first event eligibility-based event equity to the exchange medium.

Figure 4:
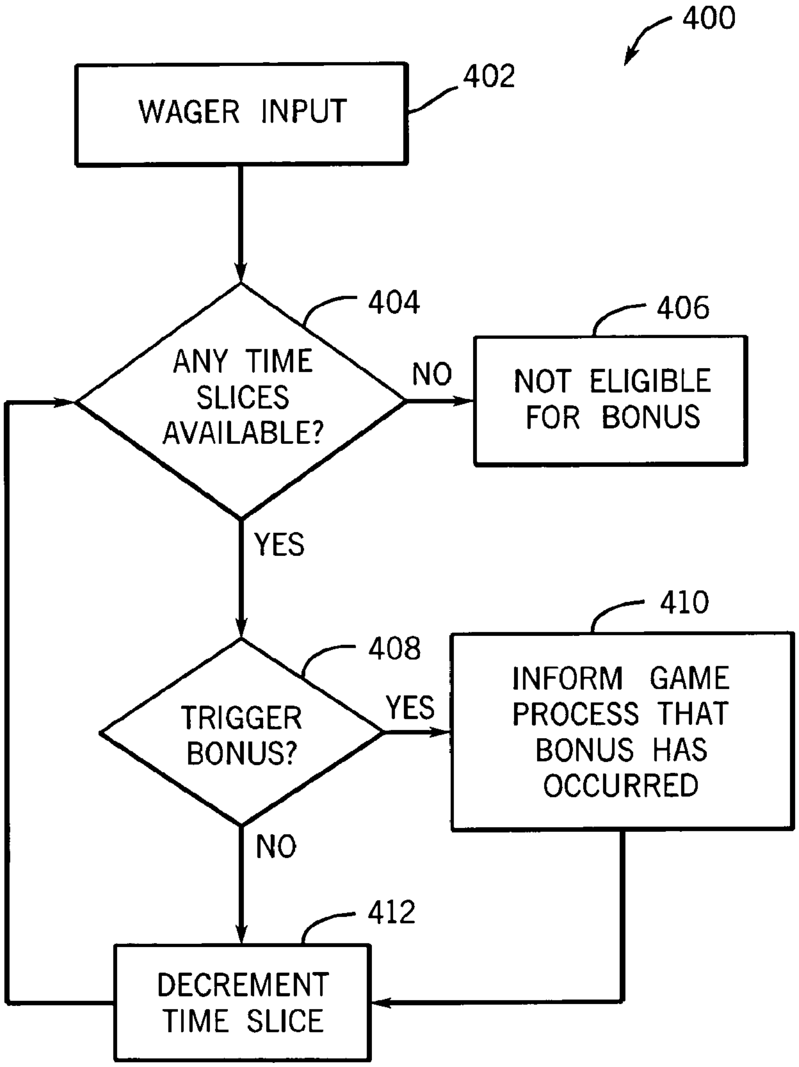
FIG. 4 is a flow chart presenting a process of determining time eligibility-based equity which is one type of event eligibility-based equity which may be advantageously employed in accordance with an embodiment of the invention for a standalone gaming machine.

Referring now to FIG. 4, a flowchart 400 illustrates a method for playing a wagering game based on event eligibility-based equity, which in this case is time eligibility of a player. Time eligibility may be measured using a time slice, which is the amount of time that a wagered amount gives eligibility to the player for playing the time based bonus game, or event. A time-slice counter may be used to increment and/or decrement time slices for increasing or decreasing the time that the player is eligible to play a time-based wagering game, which may be a bonus event, etc.

At step 402, a wager input is received from the player. A determination at step 404 is made whether any time slices are available. If not in step 406, then the player is not eligible for the bonus event. If there are time slices available, it is determined, in step 408 whether the bonus event should be triggered. If yes, at step 410, game process (discussed below with respect to FIG. 5) is informed that a bonus event has occurred. Then the time slice is decremented at step 412. If it is determined at step 408 that a bonus event should not be triggered, then the time slice is decremented at step 412. The process 400 then returns to step 404 to determine whether any time slices are available.

A bonus multiplier, which may be a function of the amount wagered with respect to time, is applied to base amounts awarded in the bonus event. For example, a slot base game may include 20 paylines. The player makes a wager of 20 credits, wherein a spin of the slot reels covers all 20 paylines at 1 credit per payline. For the player to receive a 1× bonus multiplier for 5 seconds, each time slice must be 250 milliseconds ("ms") long (5 seconds/20 credits=250 ms). Those skilled in the art will appreciate that the bonus multiplier may be awarded to a player when any number of conditions are obtained and that the multiplier may be greater than 1×.

Thus in the above example, each credit buys 1 time slice of eligibility for the bonus event. At every time slice interval, the process 400 thus determines whether a bonus event should be triggered and the number of time slices that the player has accumulated is updated. Although the above example provides time slices being purchased by the player, it should be appreciated that time slices may be obtained by the player via a number of methods, including winning time slices, obtaining a predetermined condition, and the like.

Time slice duration may be determined by a number of methods. For example, if a time-based bonus game is to take up to 10% of the total return of a wagering game, then each time slice should have an Expected Value ("EV") of 0.1 credits as shown in Equation 1. A time slice in this example is purchased for 1 credit.

$$\text{10\% of 1 credit} = \text{0.1 credits} \qquad \text{EQUATION 1}$$

In addition, the EV of each time slice may be determined as follows:

$$\text{EV of a time slice} = (\text{Chance of the bonus}) \times (\text{EV of the bonus}) \qquad \text{EQUATION 2}$$

The EV of each time slice may then be used to calculate an event eligibility-based equity amount that may be stored and/or transferred in accordance with an embodiment of the invention. For example, a first wagering game may have a time-based bonus game that is to take up to 10% of the total return of the first wagering game. Therefore, as noted above, the EV of a first time slice is 0.1 credits. Now assume that a player wishes to transfer the first time slices to a second wagering game. The second wagering game may have a time-based bonus game that is to take up to 20% of the total return of the second wagering game. Using EQUATION 1 above, the EV of a second time slice is 0.2 credits. Therefore, the player will receive one second time slice for two of the first time slices. Those skilled in the art will readily appreciate that the time slices may be exchanged for other event eligibility-based equity or cash.

Time slices can be purchased according to fixed determinations, e.g. a single wager purchases a 250 ms. time slice. Alternatively, time slices can be purchased according to random determinations. For example, a first wager purchases a 250 ms. time slice while a second wager purchases a 300 ms. time slice.

Time slices may be incremented and/or decremented according to fixed determinations, e.g., a 250 ms. time slice is incremented and/or decremented every 250 ms. of real time. Alternatively, time slices may be randomly incremented and/or decremented. For example, random interrupt signals may be sent by the controller 34 for randomly incrementing and/or decrementing the time slices.

Figure 5:
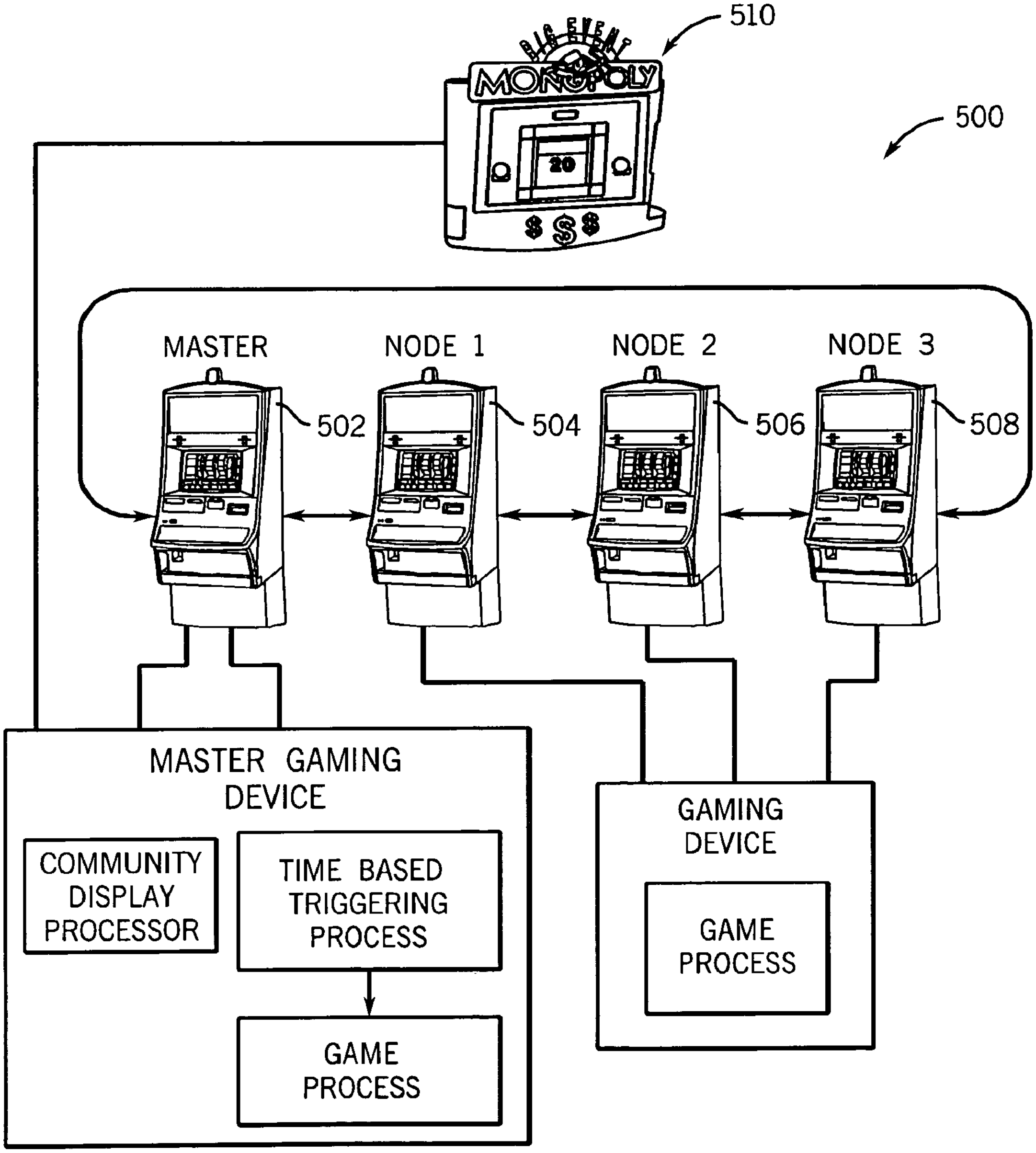
FIG. 5 is a representation of a plurality of networked gaming machines.

Referring to FIG. 5, a networked wagering gaming system 500 is shown comprised of a plurality of gaming machines 502, 504, 506 and 508 networked together for triggering a time-based bonus game, also referred to as a community bonus, such as a BIG EVENT BONUS. The gaming machines 502, 504, 506 and 508 include a master machine 502 and a plurality of node machines 504, 506 and 508. The master machine 502 triggers the community bonus for all the gaming machines 504, 506 and 508, wherein all the gaming machines 502, 504, 506 and 508 participate in the community bonus at the same time if they are eligible. The master machine 502, which may alternatively or, in addition to, include a bonus server, runs a process to determine if the community bonus should occur. If the master machine 502 determines that the community bonus should occur, then it will issue an invitation to the node machines 504, 506 and 508. Each of the gaming machines 504, 506 and 508 keeps track of its own current eligibility and therefore will make a decision whether it will allow its player to participate in the community bonus and at what multiplier (if applicable). A central display 510, which may be controlled by a community display processor, may be connected to each of the gaming machines 502, 504, 506 and 508 for displaying community events and other visual images to attract potential players to the gaming machines 502, 504, 506 and 508.

Figure 6:
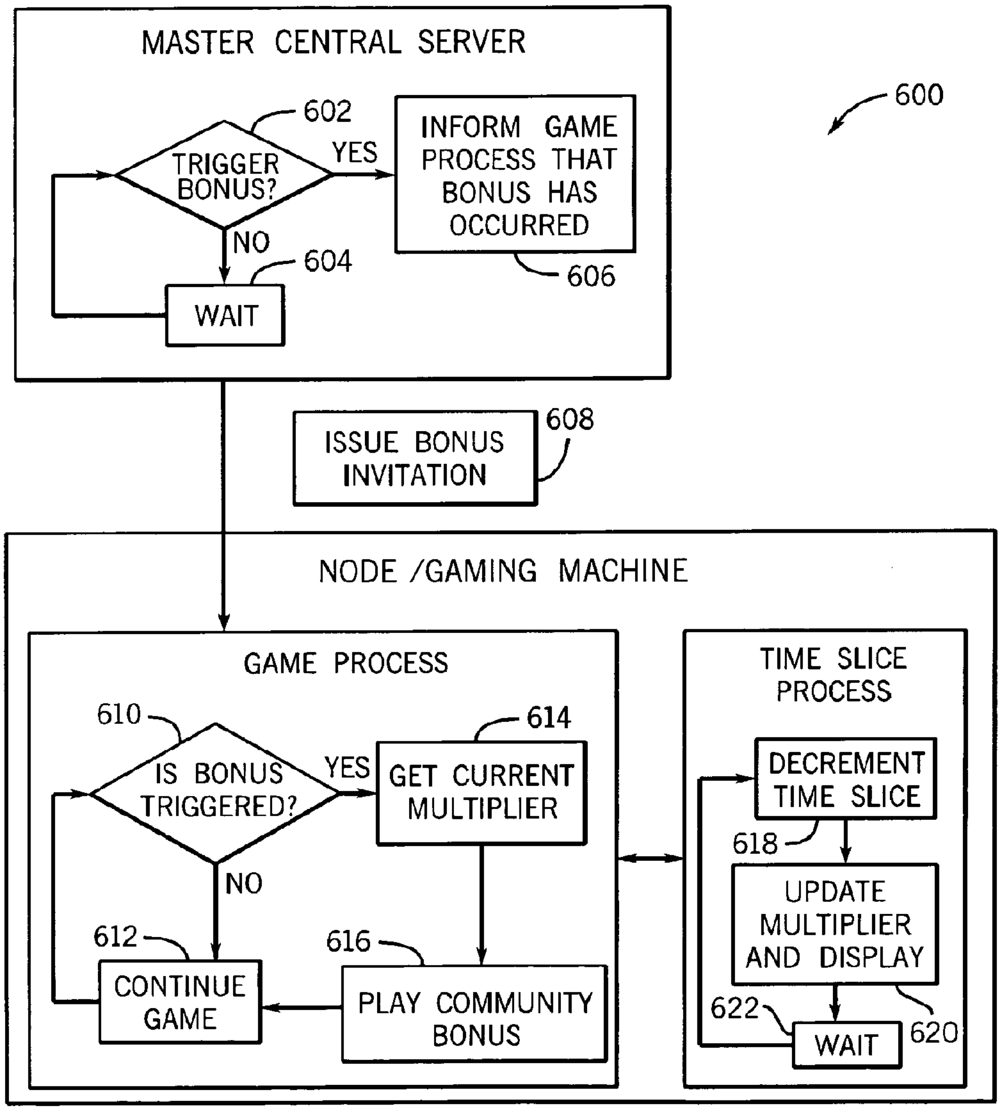
FIG. 6 is a flow chart representing a process of determining time eligibility-based equity for the networked gaming machines shown in FIGS. 4 and 5.

Referring now to FIG. 6, a flow chart 600 illustrates an interaction between a master/central server and at one gaming machine, such as gaming machine 504, during a time-based bonus process or event. At step 602, the master server determines whether a community bonus may be triggered. If not, no action is taken at step 604. If a community bonus is triggered, the master server informs the game process that the community bonus has occurred at step 606. At step 608, the master issues a bonus invitation to all the networked gaming machines including gaming machine 504.

The gaming machine 504, at step 610, makes a determination whether the community bonus has been triggered by the issuance of the bonus invitation at step 608. If no bonus invitation has been received, the gaming machine 504 continues playing a local game at step 612. If a bonus invitation has been received, the gaming machine 504, at step 614, obtains the current multiplier. If the gaming machine 504 does not have any eligible time, or event eligibility-based credit, then the multiplier is zero and the gaming machine 504 cannot participate in the community bonus. If the gaming machine 504 has eligible time, the gaming machine 504 at step 616 plays the community bonus. After the community bonus ends, the local game resumes at step 612.

A time-slice, or event eligibility-based, process for the gaming machine 504 continues generally simultaneously with the game process. At step 618, a time slice of eligibility is decremented after an equivalent unit of real time progresses, e.g. a time slice of 250 ms. is decremented after 250 ms. of time has passed in real time. If the player continues to make wagers, then it is possible for the time slices to increment (e.g., if the player makes wagers at a higher rate than he/she is currently playing games), or to remain constant. Then, at step 620 a multiplier and/or display indicator are updated as a function of the current eligibility. At step 622, the gaming machine 504 waits until it is necessary to update the eligibility time, or event eligibility-based credit.

Figure 7:
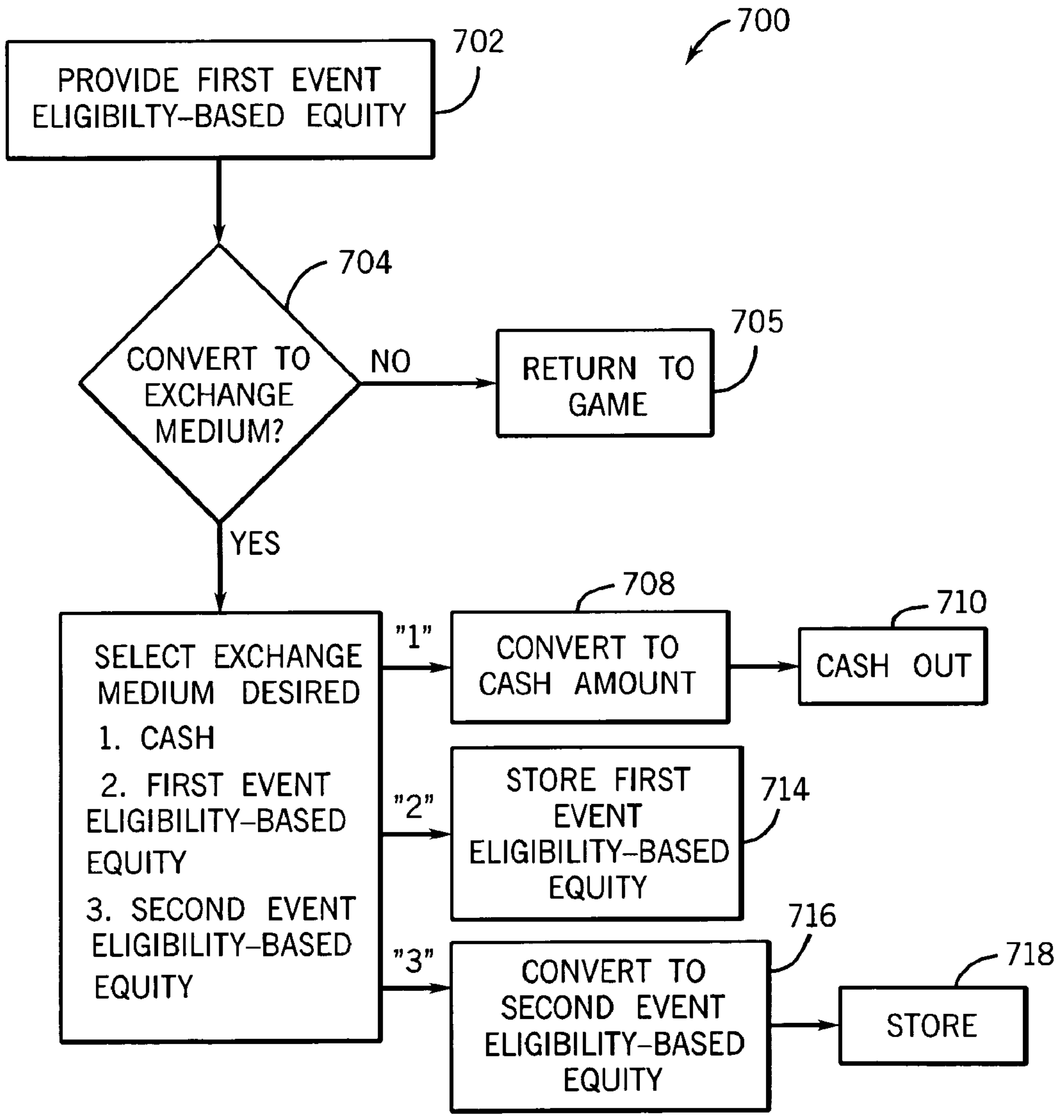
FIG. 7 is a flowchart of a method for transferring a first event eligibility-based event from a first wagering game.

Referring now to FIG. 7, a flowchart 700 of a method for storing and transferring event eligibility-based equity, such as time eligibility, is shown. A first event eligibility-based equity, such as a first time slice of eligibility, relative to a first wagering game is obtained by a player in step 702. The first event eligibility-based equity may be obtained by the player via any appropriate method, such as through playing the first wagering game, purchase of the first event eligibility-based equity and the like. The player then may have the option to convert or transfer the first event eligibility-based equity to an exchange medium at step 704. If the player does not want to convert the first event eligibility-base equity at that time, the player is returned to the wagering game at step 705. A selection of the exchange medium desired by the player occurs at step 706. The player may select any number of different exchange mediums. The player may select a cash equivalent to the first event eligibility-based equity at step 708. A conversion of the first event eligibility-based equity to the cash equivalent is performed and cash is provided to the player at step 710. The player may wish to have the first event eligibility-based equity stored for later use by the player on the first wagering game. At step 714, the first event eligibility-based equity is stored and provided to the player for use later. The player may wish to convert the first event eligibility-based equity into a second event eligibility-based equity, such as a second time slice of eligibility, for use on a second wagering game at step 716. The first event eligibility-based equity is converted using an appropriate conversion factor into the second event eligibility-based equity and the second event eligibility-based equity is provided to the player in step 718.

The player may obtain the converted cash, first event eligibility-based equity or the second event eligibility-based equity through any number of appropriate methods, such as may be associated with a ticket (from a ticket printer 52), portable data unit (e.g., a card), coins, currency bills, accounts, and the like. The converted case, first event eligibility-based equity and the second event eligibility-based equity may be stored in a storage device, such as a system processor.

The player is thus able to transfer event eligibility-based equity from one wagering game to another wagering game, to store event eligibility-based equity for later play or to cash out the event eligibility-based equity. The player has the option of converting event eligibility-based equity from a first wagering game to a second wagering game. The conversion may be performed with an appropriate conversion factor. For example, a unit of time in a first wagering game, such as a Monopoly Big Event, may be worth two units of time in a second wagering game, such as Big Bang. A standard unit of event eligibility-based equity may be utilized to simplify the conversions of such equity between wagering games. A player would then store standard units of event eligibility-based equity in an electronic account, on a ticket, on a smart card, and the like which can be readily used later. Each wagering game would then be worth a certain number of standard units. The ratio between a first and second wagering game would then determine the conversion factor between a first and second event eligibility-based equity.

In an alternative embodiment of a gaming system, players may earn partial or fractional eligibility for a bonus or secondary event. In some embodiments, future or secondary events may be progressive jackpots, prizes, awards, secondary games, or other events. As a player plays his or her wagering game, he or she may be awarded eligibility portions or fragments such that when a full eligibility group of assets is collected, the player becomes eligible for such future event. In one embodiment, the fractional eligibility may be tracked, for example by a virtual game card stored and/or displayed on a gaming terminal. The virtual game card, in one embodiment, may be a virtual "scratch-off" card, containing number of slots or "ticks" which may be earned during game play to complete the card and earn eligibility for the relevant future event. For example, the virtual game card may have five slots or ticks. During game play, certain events may cause the player to earn an eligibility fragment, which fills one of the five slots on the virtual card. When the player has played long enough to earn and collect five eligibility fragments, his or her virtual card becomes filled, as all five slots on the card are occupied. Once filled, the virtual card indicates to the player that he has satisfied or completed eligibility for the future event.

Various mechanisms may be employed in each wagering game that cause the player to be awarded one or more eligibility fragments. In one embodiment, the player may be awarded a number of eligibility fragments in response to achieving a certain outcome on a gaming device. The outcome may be randomly determined, for example a winning combination of symbols on a slot game as determined by a random number generator. In other embodiments, the outcome may be determined, at least in part, by player selection. For example, a player choosing selectable elements in a wagering game to reveal prizes, may trigger an award of an eligibility fragment if a certain pattern or order of selectable elements is chosen. In yet other embodiments, the award of eligibility fragments may be random. For example, the gaming system may award a certain number of eligibility fragments to various players either at various intervals of time, or when certain thresholds (unknown to the player) are met. The eligibility fragments may also be awarded via tournaments, casino promotions, or any other gaming mechanism in which the fragments are awarded as prizes, either alone, or in combination with other awards, credits, cash, or prizes. Other awarding mechanisms may be used in which to distribute eligibility fragments to players of the gaming system.

The gaming system may track each player's collection of eligibility fragments and associated completed eligibility for future events. In one embodiment, such tracking may be accomplished by monitoring a player through a player card or identifier associated with a player account. Thus, each player having registered for a player account may be identified at each gaming session via such player card or other identifier (such as username, biometric identifier, etc.). Once identified, the actions of the player are tracked during the gaming session by the system, and the player's collection of eligibility fragments is monitored, stored, and cataloged for future recall.

In some embodiments, a plurality of future events may be scheduled to be executed, either at predefined times, or randomly. For example, in one embodiment, a plurality of regularly occurring future events may be configured, and advertised or promoted to players. In one embodiment, future events may include a schedule of future events such as hourly events, quarter hour events, daily events, weekly events, monthly events, and yearly events. Eligibility for each event may be different, such that an hourly event may require five eligibility fragments to be collected, while a daily event may require fifteen such fragments to be collected. Additionally, eligibility fragments themselves may be uniquely associated with certain types of future events. For example, a first type of eligibility fragment may be associated with hourly events, and thus may only be collected and used on a virtual card to satisfy eligibility for an hourly event, while a second type of eligibility fragment may be associated with daily events, and thus may only be collected and used on a virtual card to satisfy eligibility for a daily event. All such scheduled future events may include any of the aforementioned activities, including the award of a progressive jackpot, a prize, a credit amount, entry into a secondary game, etc.

The various future events may be stored, displayed, and coordinated via one or more calendars which are accessible and viewable by a player via a gaming terminal, computer, over the internet, or via a mobile device. Such a calendar may display all available upcoming future events, as well as a player's accumulated eligibility for each such event. Thus, a player may look to such a gaming calendar to see which future events he is eligible for (ones for which he has accumulated the requisite number of eligibility fragments), and event for which he has not yet satisfied eligibility (for example, events for which the player has only accumulated a portion of the requisite number of eligibility fragments). This calendaring mechanism may induce or incentivize a player who has not yet qualified for a certain future event, to become so qualified by playing additional wagering games in an effort to collect more eligibility fragments and satisfy the eligibility requirements of such desirable future event.

In one embodiment, if a player satisfies eligibility for a first future event by collecting a sufficient number of eligibility fragments, such future event becomes closed or satisfied. It may appear as a special color (for example, green) on the player's virtual calendar to indicate that the player is eligible for the future event when it occurs. In other embodiments, when eligibility is completed, the future event remains "open" and a player can continue to collect eligibility fragments for such event. If a player satisfies the eligibility criteria a second time (collects the requisite number of eligibility fragments a second time), then the player remains eligible for the future event, but is given an award enhancement for having satisfied eligibility twice. In one embodiment, the award enhancement is a multiplier, for example a 2× multiplier, such that any awards which the player receives via the future event would be multiplied by two. In other embodiments, other enhancements may be provided, such as additional selections, wild symbols, multiplying wilds, bonus credit amounts, longer time in play, etc.

In an additional alternative embodiment, two or more players may be combined into groups, teams, pools, etc., such that the group's collection of eligibility fragments is pooled. Thus, a player may have an individual virtual card and virtual calendar, and any group of which he is a member may have its own collective group virtual card and virtual calendar. All players in the group may collect eligibility fragments and thus cause the group to become eligible for various future events. Any member of the group can track the group's progress via the group virtual calendar. When the group participates in a future event, such as receiving a progressive award, the award may be split among the members of the group in various ways. In one embodiment, each member of the group shares equally in the award. In another embodiment, the group members may share pro rata based upon the number of eligibility fragments collected over a certain period of time. In yet another embodiment, the players collecting the fragments for the particular event which led to the award may receive a bonus or enhancement as compared to a non-contributing group member's share of the award. Other schemes may be used to distribute the award winnings to the members of the group.

In yet another alternative embodiment, eligibility fragments may have a plurality of variables or characteristics associated with them. For example, eligibility fragments may be associated with a color (e.g. "red") as well as a number (e.g. "3"). When a player earns such a multi-variable eligibility fragment, he or she may use the eligibility fragment in an appropriate manner based on the variables. With respect to the example multi-variable eligibility fragment described, the player could fill a "red" slot on a virtual game card, or alternatively the player could fill a "3" slot on a virtual game card. Thus, the player may select from the available variables associated with the fragment in applying the fragment to one or more virtual cards the player must fill. The plurality of variables or characteristics associated with an eligibility fragment invokes strategic play and provides a player with a choice as to how to apply the eligibility fragment. Any number of variables may be used, including shape, color, size, date, time, numbers, letters, etc. In some embodiments, the virtual cards the player needs to fill are predetermined by the gaming operator. In other embodiments, a player may have input as to the type, nature and configuration of the virtual cards which he will be playing.

In operation, the system of such an embodiment induces prolonged, additional, and repetitive game play by players who are seeking to complete eligibility for various bonus games, jackpots, awards, and other future events by collecting the requisite eligibility fragments. This provides additional excitement to the player and generates additional game play and revenue for the casino or system operator. The calendaring function provides even greater incentive by allowing easy visual inspection of upcoming events and a player's accumulated eligibility for the same. Such a system is beneficial in that more players are participating more frequently in such secondary or future events, although not winning each time, but winning periodically or randomly while enjoying play of wagering games and accumulation of eligibility.

Each of these embodiments and obvious variations thereof is contemplated as falling within the spirit and scope of the claimed invention, which is set forth in the following claims.

What is claimed is:

1. A gaming system comprising:

one or more random element generators;

a plurality of gaming terminals, each gaming terminal used for gaming and presenting an outcome of a respective wagering game based, at least in part, on one or more random elements generated by at least one of the one or more random element generators, each gaming terminal including a gaming cabinet, an electronic display device, and one or more electronic input devices, the electronic display device and the one or more electronic input devices being coupled to the gaming cabinet; and one or more controllers configured to:

detect, via at least one of the one or more electronic input devices, a physical item associated with a monetary value that establishes a credit balance;

initiate a first wagering game in response to an input indicative of a wager covered by the credit balance;

determine an outcome of the first wagering game based, at least in part, on the one or more random elements;

in response to the first wagering game being played via a first gaming terminal of the plurality of gaming terminals, award a first event eligibility-based equity that allows a player to be eligible for a first event if it occurs during the first wagering game;

receive, via at least one of the one or more electronic input devices, a cashout input that initiates a payout from the credit balance; and convert the first event eligibility-based equity to a second event eligibility-based equity that allows the player to be eligible for a second event if it occurs during a second wagering game played via a second gaming terminal of the plurality of gaming terminals.

2. The gaming system of claim 1, wherein the first event eligibility-based equity is an amount of time during the first wagering game for which a player is eligible to play the first event, and wherein the second event eligibility-based equity is an amount of time during the second wagering game for which the player is eligible to play the second event.

3. The gaming system of claim 1, wherein the one or more controllers are configured to convert the first event eligibility-based equity to a second event eligibility-based equity using a conversion factor other than one.

4. The gaming system of claim 1, further including a storage medium coupled to the one or more controllers and configured to store the first event eligibility-based equity or the second event eligibility-based equity.

5. The gaming system of claim 1, wherein the one or more controllers are configured to award the first event eligibility-based equity in response to wagers on the first wagering game.

6. The gaming system of claim 1, wherein the one or more controllers are configured to convert the second event eligibility-based equity to cash.

7. A method of operating a gaming system, the gaming system include a plurality of gaming terminals, one or more controllers, and one or more random element generators, each gaming terminal used for gaming and presenting an outcome of a respective wagering game based, at least in part, on one or more random elements generated by at least one of the one or more random element generators, each gaming terminal including a gaming cabinet, an electronic display device, and one or more electronic input devices, the electronic display device and the electronic input devices being coupled to the gaming cabinet, the method comprising:

detecting, via at least one of the one or more electronic input devices, a physical item associated with a monetary value that establishes a credit balance;

initiating a first wagering game in response to an input indicative of a wager covered by the credit balance;

determining an outcome of the first wagering game based, at least in part, on the one or more random elements;

in response to the first wagering game being played via a first gaming terminal of the plurality of gaming terminals, awarding, by at least one of the one or more controllers, a first event eligibility-based equity that allows a player to be eligible for a first event if it occurs during the first wagering game;

receiving, via at least one of the one or more electronic input devices, a cashout input that initiates a payout from the credit balance; and converting, by at least one of the one or more controllers, the first event eligibility-based equity to a second event eligibility-based equity that allows the player to be eligible for a second event if it occurs during a second wagering game played via a second gaming terminal of the plurality of gaming terminals.

8. The method of claim 7, wherein the first event eligibility-based equity is an amount of time during the first wagering game for which a player is eligible to play the first event, and wherein the second event eligibility-based equity is an amount of time during the second wagering game for which the player is eligible to play the second event.

9. The method of claim 7, wherein the converting includes converting the first event eligibility-based equity to a second event eligibility-based equity using a conversion factor other than one.

10. The method of claim 7, further including storing the first event eligibility-based equity or the second event eligibility-based equity in a storage medium.

11. The method of claim 7, wherein the awarding is in response to wagers on the first wagering game.

12. The method of claim 7, further including converting, by at least one of the one or more controllers, the second event eligibility-based equity to cash.

13. A method of operating a gaming system, the gaming system include a plurality of gaming terminals, one or more controllers, and one or more random element generators, each gaming terminal used for gaming and presenting an outcome of a respective wagering game based, at least in part, on one or more random elements generated by at least one of the one or more random element generators, each gaming terminal including a gaming cabinet, an electronic display device, and one or more electronic input devices, the electronic display device and the electronic input devices being coupled to the gaming cabinet, the method comprising:

detecting, via at least one of the one or more electronic input devices, a physical item associated with a monetary value that establishes a credit balance;

initiating a first wagering game in response to an input indicative of a wager covered by the credit balance;

determining an outcome of the first wagering game based, at least in part, on the one or more random elements;

in response to the first wagering game being played via a first gaming terminal of the plurality of gaming terminals, awarding, by at least one of the one or more controllers, a first event eligibility-based equity that allows a player to be eligible for a first event if it occurs during the first wagering game;

receiving, via at least one of the one or more electronic input devices, a cashout input that initiates a payout from the credit balance; and providing, by at least one of the one or more controllers, the player with an option to convert the first event eligibility-based equity to a plurality of different exchange mediums, the plurality of different exchange mediums including cash and a second event eligibility-based equity, the second event eligibility-based equity allowing the player to be eligible for a second event if it occurs during a second wagering game played via a second gaming terminal of the plurality of gaming terminals.

14. The method of claim 13, wherein the first event eligibility-based equity is an amount of time during the first wagering game for which a player is eligible to play the first event, and wherein the second event eligibility-based equity is an amount of time during the second wagering game for which the player is eligible to play the second event.

15. The method of claim 13, further including storing the first event eligibility-based equity or the second event eligibility-based equity in a storage medium.

16. The method of claim 13, wherein the awarding is in response to wagers on the first wagering game.

17. The method of claim 13, further including selecting, responsive to player input, one of the plurality of different exchange mediums.

* * * * *